(12) United States Patent
Auclair et al.

(10) Patent No.: US 7,478,561 B2
(45) Date of Patent: Jan. 20, 2009

(54) METHOD OF FITTING A SENSOR IN A HYDRAULIC CIRCUIT, AND RIGID PIPE OF THE SAID CIRCUIT PROVIDED WITH SUCH A SENSOR

(75) Inventors: Alexandre Auclair, Chalette sur Loing (FR); Pierre-Axel Parodat, Montargis (FR); Stéphane Gendrin, Borgny sur Bionne (FR)

(73) Assignee: Hutchinson, Paris (FR)

( * ) Notice: Subject to any disclaimer, the term of this patent is extended or adjusted under 35 U.S.C. 154(b) by 555 days.

(21) Appl. No.: 11/149,319

(22) Filed: Jun. 10, 2005

(65) Prior Publication Data

US 2005/0284230 A1    Dec. 29, 2005

(30) Foreign Application Priority Data

Jun. 11, 2004 (FR) .................................. 04 06328

(51) Int. Cl.
*G01L 7/00* (2006.01)
(52) U.S. Cl. ........................................................ 73/756
(58) Field of Classification Search .................... 73/756
See application file for complete search history.

(56) References Cited

U.S. PATENT DOCUMENTS 3,934,605 A   1/1976  Legris
5,231,867 A   8/1993  Serwatsky

FOREIGN PATENT DOCUMENTS

EP    0 471 121 A1   8/1990
EP    0 585 465 A1   2/1993

*Primary Examiner*—Andre J Allen
(74) *Attorney, Agent, or Firm*—Clark & Brody

(57) ABSTRACT

A method for fitting a sensor in a hydraulic circuit utilizes at least one rigid pipe with a fixing and connecting system at least one of its two ends, wherein the pipe integrates the sensor in the fixing and connecting system without drilling a hole in the pipe in order to fit the sensor. The fixing and connecting system has a casing made of plastic which, on the one hand, receives in a fluid-tight manner the end part of the rigid pipe and, on the other hand, is terminated by a connecting end-piece. The casing has at least one tapping passage for taking a portion of the fluid conveyed by the rigid pipe to a chamber in which the sensor is housed. The casing has an aperture for fixing the fixing and connecting system.

15 Claims, 2 Drawing Sheets

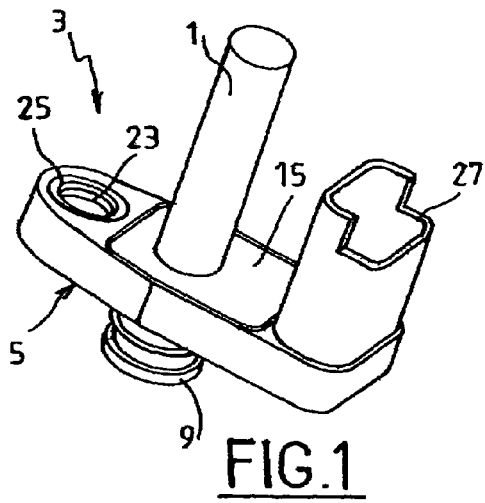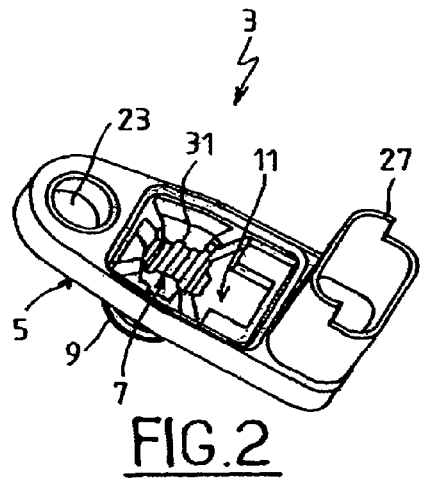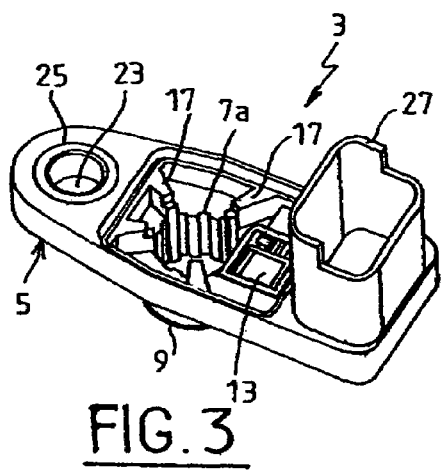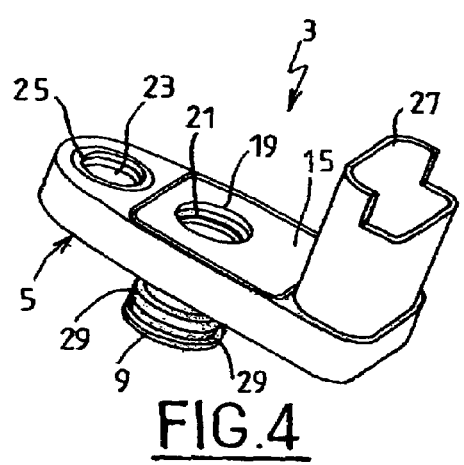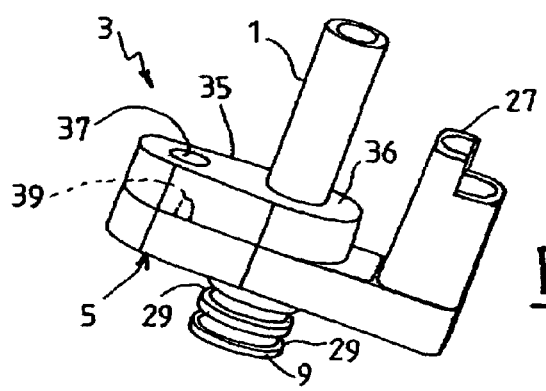

METHOD OF FITTING A SENSOR IN A HYDRAULIC CIRCUIT, AND RIGID PIPE OF THE SAID CIRCUIT PROVIDED WITH SUCH A SENSOR

FIELD OF THE INVENTION

The invention relates to a method of fitting a sensor in a hydraulic circuit, in particular an air conditioning circuit of a motor vehicle, and to a rigid pipe of the said circuit which is provided with such a sensor.

BACKGROUND OF THE INVENTION

An air conditioning circuit of a motor vehicle for example is a closed circuit which comprises several elements, in particular a compressor, a condenser, a desiccant reservoir, an expansion system, an evaporator and sometimes a pipe, in which elements flows a refrigerating fluid. All of these elements of the air conditioning circuit are connected by rigid and/or flexible pipes which have near each of their two ends a fixing and connecting system.

Furthermore, the whole air conditioning circuit also comprises pressure and/or temperature sensors which are connected to a control unit for managing the functioning of the air conditioning circuit. At present, the fitting of a sensor is carried out by tapping into one of the constituent elements of the circuit, most often in a rigid pipe of the circuit, which necessitates drilling a hole in the element, which is most often made of aluminum, in order to engage in it one end of a rigid support of the sensor.

The fixing of this support, generally made of aluminum, is carried out by a brazing operation which is difficult to carry out because it must be perfectly fluid-tight over the whole of the periphery of the hole drilled in the element of the hydraulic circuit in which it has been fixed.

BRIEF SUMMARY OF THE INVENTION

One purpose of the invention is to propose a new method for fitting a sensor and whose originality is particularly in the absence of a drilled hole, in this instance in a rigid pipe of the hydraulic circuit, in order to fit the sensor there.

For this purpose, the invention proposes a method of fitting a sensor in a hydraulic circuit such as an air conditioning circuit, the said circuit comprising at least one rigid pipe with a fixing and connecting system at at least one of its two ends, which is characterized in that it consists in integrating the sensor in the fixing and connecting system without drilling a hole in the rigid pipe in order to fit the sensor there.

In general, the fixing and connecting system is produced in the form of a casing, preferably made of plastic, which, on the one hand, receives in a fluid-tight manner the end part of the rigid pipe and, on the other hand, is terminated by a connecting end-piece.

According to a first embodiment of the fitting method according to the invention, the sensor is fitted in an internal housing or chamber of the casing, and the chamber is closed by a metal or plastic plate pierced with an aperture in which the end part of the rigid pipe is fixed in a fluid-tight manner, and by forming in the casing at least one tapping passage for directing a portion of fluid on intake or on outlet from the rigid pipe to the sensor.

According to a variant embodiment of this first embodiment, there is added to the free outside part of the rigid pipe a reinforcement flange plate, normally made of metal but which could be made of any other appropriate material (such as a reinforced plastic), the flange plate being pierced with a first hole for the passage of the rigid pipe and with a second fixing hole axially aligned with a fixing hole formed in the casing which is joined against the reinforcement flange plate in order to avoid creep over the course of time of the plastic of the casing after it has been fixed.

According to a second embodiment of the method according to the invention, the casing is made in the form of a block with a central passage which supports the sensor on its periphery with a radial passage pierced in the casing to connect the sensor with the central passage in which the fluid flows.

In the casing there is also formed an aperture suitable for receiving a fixing means of the connecting and fixing system.

The invention also relates to a rigid pipe of a hydraulic circuit, in particular of an air conditioning circuit, which has at at least one of its two ends a connecting and fixing system integrating a pressure and/or temperature sensor to implement the above method, and to an air conditioning circuit provided with such a rigid pipe.

BRIEF DESCRIPTION OF THE DRAWINGS

Other advantages, features and details of the invention will become apparent from the following additional description given with reference to the appended drawings, given solely by way of example and in which:

FIG. 1 is a perspective view to illustrate the end of a rigid pipe of a hydraulic circuit with its fixing and connecting system according to a first embodiment of the invention;

FIGS. 2 to 4 are perspective views to illustrate details of the fixing and connecting system according to the first embodiment of the invention;

FIG. 5 is a perspective view of a variant embodiment of the first embodiment shown in FIG. 1;

DETAILED DESCRIPTION OF THE INVENTION

Figure 6A:
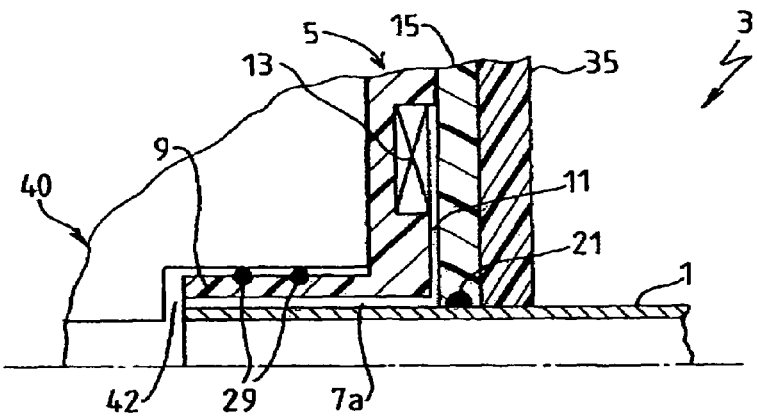
FIGS. 6a and 6b are half-views in partial cross-section of FIG. 5 in order to illustrate two variant embodiments.

In FIG. 1, there has been shown one end of a rigid pipe 1 of a hydraulic circuit, in particular of an air conditioning circuit of a motor vehicle, with a fixing and connecting system 3 fitted at one end of the pipe 1 and which integrates a pressure or temperature sensor without it being necessary to drill a hole in the rigid pipe 1 in order to fit the sensor.

The assembly of the fixing and connecting system 3 according to FIG. 1 will be explained below with reference to FIGS. 2 to 4 in order to illustrate a first embodiment of the invention.

The fixing and connection system 3 consists of a casing 5, preferably made of plastic and whose shape is illustrated in FIG. 2. The casing 5 is pierced with a central aperture 7 which, at one end, is extended by a connecting end-piece 9 and, at the other end, emerges into an internal housing or chamber 11 which connects with the central aperture 7. The pressure or temperature sensor 13 is fitted and fixed in the chamber 11 as shown in FIG. 3. The chamber 11 is closed in a fluid-tight manner by means of a plate 15 forming a cover (FIG. 4) which bears on bosses 17 protruding from the bottom of the chamber 11 (FIG. 3). The plate, which can be metal or plastic, is pierced with an aperture 19, axially aligned with the central aperture 7 of the casing 5. The plate 15 has sufficient thickness to form in its aperture 19 a groove 21 capable of receiving a sealing "O" ring (FIG. 4). Towards one end, the casing 5 is pierced with a fixing aperture 23 (FIGS. 1 to 4)

which can receive a metal reinforcing eye 25 (FIGS. 3 and 4) and, towards its other end, a part forming a sleeve 27 for the passage of electrical conductors going from the sensor 13 to a control unit (not shown). The connecting end-piece 9 of the casing 5 has at least one peripheral groove 29 capable of receiving a sealing "O" ring (FIG. 4).

Thus, in order to achieve the assembly shown in FIG. 1, the non-provided casing 5 shown in FIG. 2 is taken and the sensor 13 is fitted in the chamber 11 of the casing 5 (FIG. 3), the chamber 11 is closed by the plate 15 (FIG. 4) and the rigid pipe 1 is fixed in the aperture 19 of the plate 15, knowing that the free end of the rigid pipe 1 can penetrate more or less into the inside of the casing 5 as will be explained below with reference to FIGS. 6a and 6b. The fixing of the rigid pipe 1 in the aperture 19 of the plate 15 is carried out in a fluid-tight manner by an operation which is known per se of force-fitting, dying, tube expansion or rotation-fusion for example, the fluid-tightness possibly being able to be obtained by the presence of a "O" ring in the groove 19 of the aperture 21 of the plate 15. Finally, the threaded part of a bolt, for example, is engaged in the aperture 23 of the casing 5 in order to fix the connection and fixing system 3 onto one of the elements of the air conditioning circuit.

However, as this fixing takes place at the level of a plastic casing 5, this plastic can be caused to creep over the course of time and harm the secure holding of the fixing.

Also, in order to overcome this disadvantage and according to a variant embodiment shown in FIG. 5, there is provided a metal reinforcement flange piece 35 forming a fixing foot-piece which is pierced by a first hole 36 traversed by the end part of the rigid pipe 1 which is fixed to the metal part 35 by an operation of end-piece shaping which is known per se such as dying, tube expansion or even brazing for example, and by a second fixing hole 37 which is axially aligned with the fixing hole 23 of the casing 5 which is fitted against the metal flange piece 35. In order to pre-assemble the casing 5 and the metal flange piece 35 together, it is possible, for example, to provide a positioning stud 39 integral with the casing 5 and which penetrates a blind hole in the metal flange piece 35.

Figure 6B:
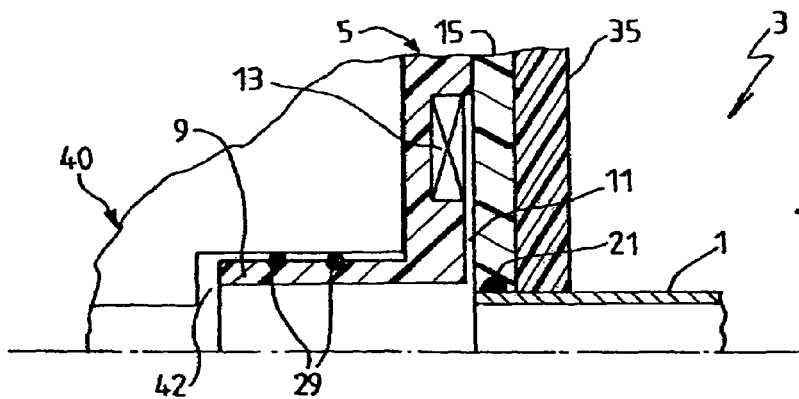

The rigid pipe 1 with its fixing and connecting system 3 is then connected to a female end-piece 40 of the air conditioning circuit as shown schematically in FIGS. 6a and 6b which are half cross-sections of FIG. 5. The female end-piece 40 has a cavity 42 capable of receiving the connecting end-piece 9 of the casing 5, the casing 5 bearing against the female end-piece 40. In general, the sensor 13 not being fitted in the axis of the central aperture 7 of the casing 5, it is necessary to provide a tapping of the fluid conveyed by the rigid pipe 1 in order to bring it to the sensor 13, and the realization of this tapping depends on the degree of penetration of the rigid pipe 1 in the casing 5.

In the example embodiment shown in FIG. 6a, the rigid pipe 1 is inserted in the casing 5 until it penetrates into the connecting end-piece 9. In this case, the tapping of the fluid is ensured by at least one groove 7a machined in the central aperture 7 and which forms a passage capable of tapping a portion of the fluid, on inlet or on outlet of the rigid pipe 1, to the chamber 11 in order to reach the sensor 13. Assuming that the sensor 13 is a pressure sensor, its membrane will be deformed by the pressure of the fluid and the deformations will be converted into electrical signals which will be transmitted to the control unit.

In the example embodiment shown in FIG. 6b, the rigid pipe 1 is inserted into the casing 5 but without penetrating into the inside of the end-piece 9, its free end not protruding beyond the plate 15 of the casing 5. In this case, the tapping of the fluid is directly provided by the chamber 11 of the casing 5 in which the sensor 13 is housed.

Figure 7:
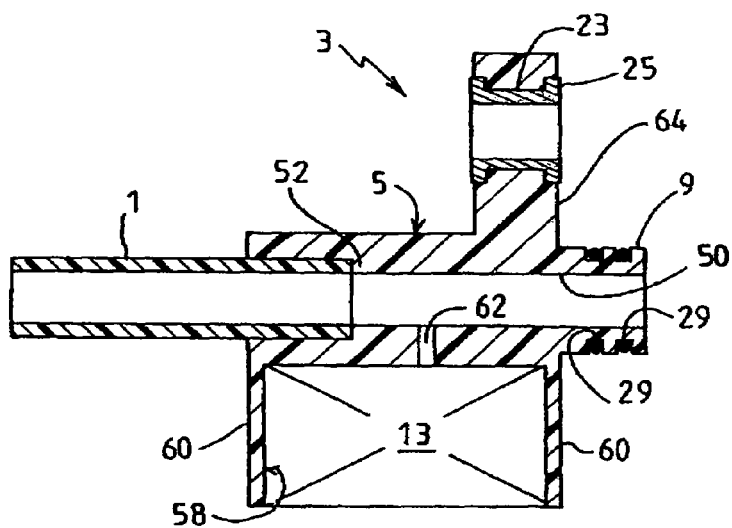
FIG. 7 is a view in cross-section of a fixing and connecting system according to a second embodiment of the invention.

According to another embodiment shown in a schematic manner in FIG. 7, the fixing and connecting system 3 is formed by a casing 5 which is fixed directly to one end of the rigid pipe 1 but with a sensor 13 positioned in another way.

More precisely, this casing 5, which can also be made of plastic, has a tubular body pierced by a central aperture 50 for the passage of the fluid. Towards one end of the part, the central aperture 50 has a diameter that is enlarged to slightly greater than the external diameter of the rigid pipe 1, and delimits a shoulder 52 forming a stop for the end of the rigid pipe 1 engaged in the central aperture 50. The fixing of the rigid pipe 1 in the central aperture 50 can be carried out in a fluid-tight manner by means of a glue or by an operation of rotation-fusion for example. Towards its other end, the casing 5 forms a connecting end-piece 9 with at least one peripheral groove 29 capable of receiving an "O" ring to ensure fluid-tightness. At its peripheral surface, the casing 5 comprises a housing 58 delimited by at least two radial walls 60 and capable of receiving the sensor 13 which is connected with the fluid by a radial channel 62 formed in the thickness of the casing 5 and which connects with the central aperture or passage 50. At its peripheral surface, the casing 5 also comprises a radially external boss forming a fixing lug 64 pierced by an aperture 23 for the passage of a screw and/or the shaft of a bolt for example. A metal eye 25 can be fitted in the aperture 66 to ensure a better fixing of the fixing and connecting system 3.

The present invention is not limited to the examples of embodiment described and shown. Thus, the end-piece 9 can be a male end-piece as illustrated above, but can alternatively be a female end-piece when the receiving end-piece of the air conditioning circuit is a male end-piece.

More generally, the end-piece 9 is capable of being inserted in any element of the air conditioning circuit, the compressor, the condenser, a desiccant reservoir, the expansion system, the evaporator or a pipe, connected by rigid and/or flexible pipes.

Moreover, the aperture 19 of the plate 15 can have a conformation profile more elaborate than a simply tubular conformation, in order to be able to fix a pipe 1 with a pilot end-piece, with a collar, of the snap-on or other type which has the complementary complex conformation.

In general, the invention applies to any hydraulic circuit and is not limited to an air conditioning circuit for a motor vehicle.

The invention claimed is:

1. A method for fitting a sensor (13) in a hydraulic circuit such as an air conditioning circuit, the said circuit comprising at least one rigid pipe (1) with a fixing and connecting system (3) at at least one of its two ends, wherein it consists in integrating the sensor (13) in the fixing and connecting system (3) without drilling a hole in the rigid pipe (1) in order to fit the sensor (13) there, in producing the fixing and connecting system (3) in the form of a casing (5) made of plastic which, on the one hand, receives in a fluid-tight manner the end part of the rigid pipe (1) and, on the other hand, is terminated by a connecting end-piece (9), in providing in the casing (5) at least one tapping passage for taking a portion of the fluid conveyed by the rigid pipe (1) to the chamber (11) in which the sensor (13) is housed, and in providing in the casing (5) a means (23) for receiving a means of fixing the fixing and connecting system (3).

2. The fitting method as claimed in claim 1, wherein the chamber (11) in which the sensor (13) is housed is closed by a plate (15) pierced with an aperture (19) in which the end part of the rigid pipe (1) is fixed in a fluid-tight manner.

3. The fitting method as claimed in claim 1, wherein there is added to the free outside end part of the rigid pipe (1) a reinforcement flange plate (35) pierced with a first hole (36) for the passage of the rigid pipe (1) and with a second fixing hole (37) axially aligned with a fixing hole (23) pierced in the casing (5) which is joined against the reinforcement flange plate (35).

4. The fitting method as claimed in claim 1, wherein the casing (5) is made in the form of a block with a central passage (50) and which supports the sensor (13) on its periphery with a radial passage (62) pierced in the casing (5) to connect the sensor (13) with the central passage (50) in which the fluid flows.

5. A rigid pipe for a hydraulic circuit, in particular for an air conditioning circuit of a motor vehicle, comprising a fixing and connecting system (3) at one of its ends, and which is provided with a pressure or temperature sensor (13), wherein the sensor (13) is integrated in the fixing and connecting system (3) and wherein the fixing and connecting system (3) consists of a casing (5) which receives in a fluid-tight manner the end part of the rigid pipe (1), which is terminated by a connecting end-piece (9) and which has at least one tapping passage to take a portion of the fluid conveyed by the rigid pipe (1) to a housing or chamber (11) of the casing (5) in which the sensor (13) is housed and which has a means (23) for receiving a means of fixing the fixing and connecting system (3).

6. The rigid pipe as claimed in claim 5, wherein the chamber (11) is closed in a fluid-tight manner by a plate (15) which is pierced with an aperture (19) in which the rigid pipe (1) is fixed by an operation of force fitting, dying, tube expansion or rotation-fusion.

7. The rigid pipe (1) as claimed in claim 6, wherein the casing (5) is also pierced with an aperture (23) for the passage of a fixing element of the fixing and connecting system (3).

8. The rigid pipe as claimed in claim 5, wherein the casing (5) is pierced with a central aperture (7) which emerges into the chamber (11) where the sensor (13) is housed and wherein the tapping passage is formed by at least one groove (7a) machined in the central aperture (7) at the level of the connecting end-piece (9), when the free end of the rigid pipe (1) penetrates at least partially into the connecting end-piece (9).

9. The rigid pipe (1) as claimed in claim 8, wherein the tapping passage is formed by the chamber (11) when the free end of the rigid pipe (1) does not penetrate into the connecting end-piece (9).

10. The rigid pipe (1) as claimed in claim 5, wherein the casing (5) is made of plastic, and wherein a reinforcement flange plate (35) is fixed around the rigid pipe (1) and against which the casing (5) bears, the said flange plate being pierced with a fixing aperture (37) axially aligned with the receiving means (23) of the casing (5).

11. The rigid pipe (1) as claimed in claim 5, wherein the fixing and connecting system (3) consists of a casing (5) in the form of a block pierced by a central aperture (50) which receives, on the one hand and in a fluid-tight manner, the end part of the rigid pipe (1) and which, on the other hand, is terminated by a connecting end-piece (9) and wherein the casing (5) externally supports the sensor (13) which connects with the central aperture (50) by a radial passage (62) formed in the casing (5).

12. The rigid pipe (1) as claimed in claim 11, wherein the casing (5) also comprises a reinforcement flange plate (64) pierced by the receiving means (23) for the passage of a fixing element.

13. A hydraulic circuit, in particular an air conditioning circuit of a motor vehicle, comprising in particular a rigid pipe (1) with, at one of its two ends, a fixing and connecting system (3) and a pressure or temperature sensor (13), wherein the sensor (13) is integrated in the fixing and connecting system (3) as claimed in claim 5.

14. The rigid pipe as claimed in claim 6, wherein the casing (5) is pierced with a central aperture (7) which emerges into the chamber (11) where the sensor (13) is housed and wherein the tapping passage is formed by at least one groove (7a) machined in the central aperture (7) at the level of the connecting end-piece (9), when the free end of the rigid pipe (1) penetrates at least partially into the connecting end-piece (9).

15. The rigid pipe as claimed in claim 7, wherein the casing (5) is pierced with a central aperture (7) which emerges into the chamber (11) where the sensor (13) is housed and wherein the tapping passage is formed by at least one groove (7a) machined in the central aperture (7) at the level of the connecting end-piece (9), when the free end of the rigid pipe (1) penetrates at least partially into the connecting end-piece (9).

* * * * *